Figure 1:
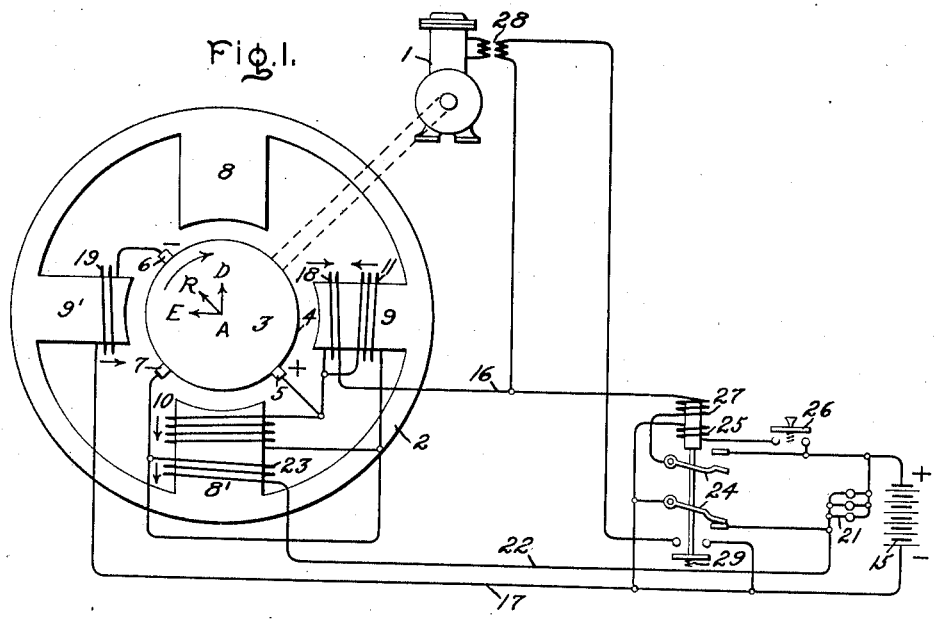

S. R. BERGMAN.
ELECTRICAL SYSTEM.
APPLICATION FILED OCT. 26, 1920.

1,426,947.

Patented Aug. 22, 1922.

Inventor:
Sven R. Bergman,
by Albert G. Davis
His Attorney.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

ELECTRICAL SYSTEM.

1,426,947.  Specification of Letters Patent.  Patented Aug. 22, 1922.

Application filed October 26, 1920. Serial No. 419,697.

*To all whom it may concern:*

Be it known that I, SVEN R. BERGMAN, a subject of the King of Sweden, residing at Nahant, county of Essex, State of Massachusetts, have invented certain new and useful Improvements in Electrical Systems, of which the following is a specification.

My invention relates to electrical systems and particularly to systems in which a plurality of translation circuits are supplied with electrical energy from a single dynamo electric machine.

My invention is especially applicable to electrical systems commonly known as farm lighting systems, which comprise a power and lighting circuit, a storage battery adapted to supply energy to said circuit, an internal combustion engine and a dynamo electric machine arranged to operate as a motor to crank the engine, and to be driven by the engine to supply current to charge the battery and to supply current to the power and lighting circuit while the battery is being charged.

It is well known that a much higher voltage than the discharging voltage of the battery is required to charge the battery and therefore a lighting circuit cannot be connected directly across the battery terminals while the battery is being charged without injuring the lamps. Furthermore, it is well known that the most efficient operation of incandescent lamps is obtained when the voltage impressed thereon remains substantially constant, whereas the best results in charging a storage battery are obtained when the voltage impressed across the battery terminals at the beginning of the charge is relatively low and the current input relatively high and at the end of the charge the voltage impressed across the battery terminals is relatively high and the current input low so as to give the battery what is known as a taper charge. Therefore it is desirable to have a dynamo electric machine which is adapted to supply current to the battery at a voltage which varies with the amount of current being supplied thereto, and which is adapted to supply current to the lighting and power circuit at a lower voltage than that supplied to the battery but which remains substantially constant.

One object of my invention is to provide in an electrical system of the type referred to, an inherently regulated self-excited dynamo electric machine adapted to supply electrical energy to one translation circuit at a voltage having a certain characteristic and electrical energy to another translation circuit at a voltage having a different characteristic.

Another object of my invention is to provide in a farm lighting system an inherently regulated self-excited dynamo electric machine which will operate efficiently as a motor to crank the engine and as a generator to supply current to the battery and to the power and lighting circuit, the machine being so constructed and arranged that the voltage impressed upon the power and lighting circuit remains substantially constant, while the voltage impressed across the battery terminals varies so as to give the battery a suitable taper charge.

In accordance with my invention I provide a commutator type dynamo electric machine having an $n$ pole armature winding and a field structure comprising $2n$ mechanical poles arranged in two sets with an equal number of poles in each set and with certain adjacent poles in the separate sets arranged to be of like polarity. At least three brushes are arranged to bear upon the commutator, this being the smallest number possible with a two pole armature. I am thus enabled to derive from the armature, three electromotive forces, one of which is the resultant of the other two. Two of the brushes are spaced substantially 180 electrical degrees apart and arranged with respect to said poles so that the voltage between said brushes is dependent on the flux in both sets of poles. One set of poles is arranged to produce a voltage between the third brush and one of the 180 degree brushes and the other set is arranged to produce a voltage between the third brush and the other 180 degree brush. By connecting one of the translation circuits across two of the brushes and another of the translation circuits across two other brushes and properly controlling the flux in each of said sets of poles, I am enabled by the inherent action of the machine to supply each translation circuit with a voltage having the desired characteristics.

My invention will be better understood from the following description taken in connection with the accompanying drawings, and its scope will be pointed out in the appended claims.

Figure 2:
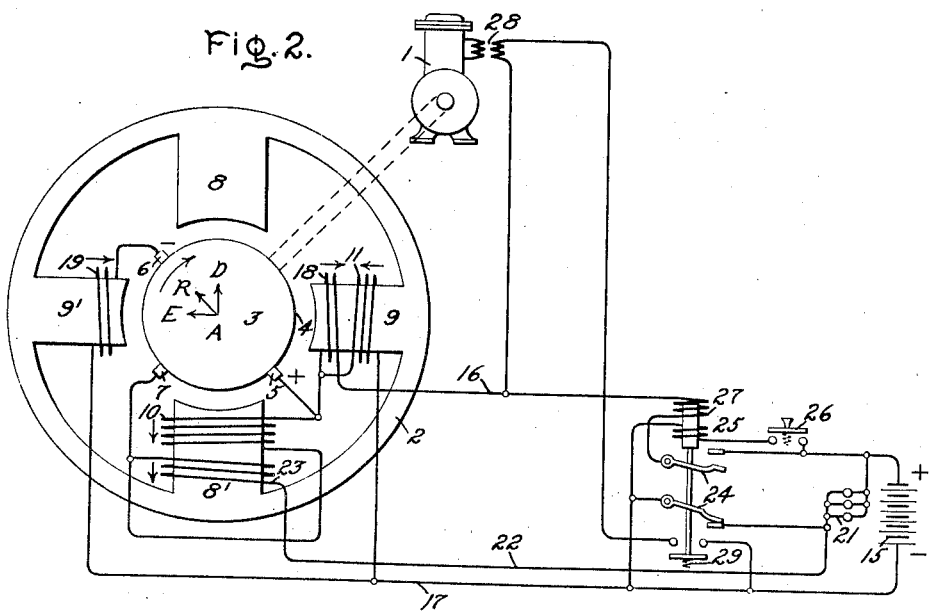

Referring to the drawings Fig. 1 illustrates one embodiment of my invention, and Fig. 2 illustrates a modification of the arrangement shown in Fig. 1.

Referring to Fig. 1 of the drawings, 1 represents a prime mover such as any of the well-known types of internal combustion engines connected to a dynamo electric machine 2 which is adapted to operate either as a motor or as a generator. This machine is provided with an armature 3 having a two pole armature winding wound thereon and a commutator 4 on which bear the brushes 5 and 6 which are spaced substantially 180 electrical degrees apart and a third brush 7 located between the 180 degree brushes, and a field structure having two sets of mechanical field poles 8—8' and 9—9' surrounding the armature 3. It will be observed that the number of mechanical field poles is twice the number of poles of the armature winding, and this relation may be broadly expressed by saying that the machine has an $n$ pole armature and a field structure having $2n$ mechanical field poles. The mechanical field poles are arranged in two sets with an equal number of poles in each set and so that certain adjacent poles of the sets are of like polarity. In the arrangement shown, the poles 8—8' are excited by the exciting winding 10 which is connected to the brushes 5 and 7 and the field poles 9—9' are excited by the exciting winding 11 which is also connected across the brushes 5 and 7. These exciting windings are so arranged that the poles 8 and 9 and the poles 8' and 9' are of like polarity. In order to simplify the drawing, the exciting windings for each set of poles are shown on only one pole of the set, but in the machine as actually constructed the windings are preferably equally distributed on all the poles of the set. The brushes 5, 6 and 7 and the sets of field poles 8—8' and 9—9' are so arranged with respect to each other that the voltage between the brushes 5 and 7 depends upon the flux in the set of poles 8—8' only, and the voltage between the 180 degree brushes 5 and 6 depends upon the flux in both sets of poles. Since the poles 8 and 9 and 8' and 9' are of like polarity, the voltage between the brushes 5 and 6 is equal to the voltage between the brushes 5 and 7 plus the voltage between the brushes 6 and 7. The armature winding is so arranged that when the armature 3 is rotated in the direction indicated by the arrow, the brush 5 is the positive brush and the current flowing through the armature winding between brushes 5 and 6 produces a cross magnetizing magneto-motive force AR which is substantially in line with the brushes 5 and 6 and which may be resolved into two components; AD which is in opposition to the magnetomotive force of the exciting winding 10 on the set of poles 8—8', and AE which is in the same direction as the magnetomotive force of the exciting winding 11 on the set of poles 9—9'. The current flowing through the armature winding between the brushes 5 and 7 only also produces a cross-magnetizing magnetomotive force in line with the component AE of the cross-magnetizing magnetomotive force AR.

The polar arc embraced by the set of poles 8—8' is considerably greater than that embraced by the set of poles 9—9' as the voltage required to be developed between the brushes 5 and 7 is considerably greater than that required to be developed between the brushes 6 and 7.

15 represents a storage battery which is adapted to be charged with current supplied through conductors 16 and 17 which are connected to the brushes 5 and 6 respectively. A field winding 18 on the set of poles 9—9' is connected in series with the conductor 16 and arranged to produce a magnetomotive force in opposition to the magnetomotive force of the exciting winding 11. A field winding 19 which is connected in series with the conductor 17 is also provided on the set of poles 9—9' and is arranged to produce a magnetomotive force in opposition to the magnetomotive force of the exciting winding 11.

A power and lighting circuit 21 which requires a substantially constant voltage to be impressed thereon and which is shown as a lamp circuit, is connected so as to be supplied with current from the battery 15 when the battery is not being charged and to be supplied with current from the dynamo electric machine 2 through conductors 16 and 22, which are connected to the brushes 5 and 7 respectively, when the battery is being charged. A field winding 23 which is connected in series with the conductor 22 is provided on the set of poles 8—8' and arranged to produce a magnetomotive force in the same direction as the magnetomotive force of the exciting winding 10. Since the voltage generated between the brushes 5 and 6 is equal to the voltage between the brushes 5 and 7 plus the voltage between brushes 7 and 6 it will be evident that the voltage impressed upon the power and lighting circuit 21 is less than that impressed upon the battery 15.

Any suitable means may be provided for controlling the starting and stopping of the engine 1 and the connections between the battery 15, the power and lighting circuit 21, and the dynamo electric machine 2. The particular arrangement shown comprises an automatic switch 24 having a shunt winding 25, which is adapted to be connected across the battery 15 by a manually operated starting switch 26, and a series winding 27 connected in series with the lead 16. The switch 24 in its open position completes a circuit connecting the power and lighting circuit 21 directly across the battery 15. In the closed position of the automatic switch 24, this circuit is broken and the circuits between the brushes 5 and 7 and the power and lighting circuit 21 and between the brushes 5 and 6 and the battery 15 are completed. A circuit for the ignition coil 28 of the engine is also completed across the leads 16 and 17 when the switch 24 is closed. A spring 29 is provided to restore the switch to its open position when the windings 25 and 27 are deenergized.

The operation of the system shown in Fig. 1 of the drawing is as follows:

When the engine is idle, the apparatus occupies the position shown in the drawing and current is supplied from the battery 15 directly to the power and lighting circuit 21 through the contacts of the switch 24. When it is desired to run the machine 2 to supply current to charge the battery 15, the starting switch 26 is closed thereby allowing current to flow from the positive side of the battery 15 through the shunt winding 25 of the automatic switch 24 to the negative side of the battery. Switch 24 thereupon closes and completes a circuit from the positive side of the battery 15 through the series winding 27 of the automatic switch 24, conductor 16, series field winding 18, brush 5, armature winding of the dynamo electric machine 2, brush 6, series field winding 19 conductor 17 to the negative side of the battery. Current also flows from the positive side of the battery to brush 5 over the circuit traced above, and then through the exciting field windings 11 and 10 in multiple, brush 7, armature winding of the dynamo electric machine, brush 6, to the negative side of the battery through the circuit previously described. Current also flows from the positive side of the battery through the power and lighting circuit 21, conductor 22, series field winding 23, brush 7 and then to the negative side of the battery through the circuit previously described. Current also flows through the ignition coil 28 of the engine as this coil is connected to conductors 16 and 17 by contacts of the switch 24. Since the series field windings 18 and 19 are wound so as to act differentially with the exciting winding 11, when the machine is acting as a generator, these windings act accumulatively with the exciting winding 11 when the machine is acting as a motor. Also, since the current, if there is a load connected to the power and lighting circuit 21, flows through the series field winding 23 at this time in the same direction as when the machine is operating as a generator, this winding acts accumulatively with the exciting winding 10. Furthermore, the current through the armature winding produces at this time a cross-magnetizing magnetomotive force in line with the brushes 5 and 6 which is in the opposite direction to the cross-magnetizing magnetomotive force AR and this magnetomotive force may be resolved into two components, one which is in the opposite direction to the component AD and therefore in the same direction as the magnetomotive force of the exciting winding 10 on the set of poles 8—8', and another component which is in the opposite direction to the component AE and therefore in opposition to the magnetomotive force of the exciting winding 11 on the set of poles 9—9'. The component of the cross-magnetizing magnetomotive force in line with the set of poles 9—9' is, however, more than counter-balanced by the magnetomotive force of the series windings 18 and 19. Therefore, it will be seen that the machine acts as a compound wound motor and develops a very high torque for cranking the engine.

When the engine begins to operate, the speed of the armature 3 is increased and the machine acts as a generator to supply current to the power and lighting circuit 21 and to the battery 15. The voltage developed between the brushes 5 and 7 is impressed upon the power and lighting circuit 21 and the voltage developed between the brushes 5 and 6 which is equal to the voltage developed between the brushes 5 and 7 plus the voltage developed between the brushes 6 and 7 is impressed upon the battery 15.

The engine is preferably provided with governing means of any suitable type whereby the speed thereof remains substantially constant.

As soon as the machine 2 begins to operate as a generator, current flows through the series winding 27 of the automatic switch 24 so that it acts accumulatively with the shunt winding 25. Therefore, the starting switch 26, which is held in its closed position until the engine starts, may be released and the automatic switch 24 will remain in its closed position as long as the current through the coil 27 exceeds a predetermined value. The shunt coil 25 is so designed that the ampere turns thereof exceeds the ampere turns of the coil 27 while the battery is supplying current to the machine 2 to operate it as a motor, thereby keeping the switch 24 closed during this operation.

In order to give the battery a suitable taper charge, the series windings 18 and 19 are provided in series with the battery circuit and are arranged to produce a magnetomotive force in opposition to the magnetomotive force of the exciting winding 11 on the set of poles 9—9' and the component AE of the cross magnetizing magnetomotive force. The windings are so arranged that the magnetomotive force thereof more than compensates for the component AE of the magnetomotive force due to the current in the armature winding. Therefore, with this arrangement, at the beginning of the charge when the current input into the battery is large, the voltage developed by the flux in the set of poles 9—9' is a minimum and the voltage developed between brushes 5 and 6 is also a minimum. As the battery becomes charged and the charging current decreases, the voltage developed by the flux in the set of poles 9—9' increases and therefore the voltage impressed across the terminals of the battery increases.

In order to maintain the voltage impressed upon the power and lighting circuit substantially constant irrespective of the load connected thereto, I provide the series winding 23 on the set of poles 8—8' which acts accumulatively with the exciting winding 10. The magnetomotive force of this winding is of such magnitude that, with the machine running at a substantially constant speed, the voltage generated thereby in the armature winding between the brushes 5 and 7 is sufficient to compensate for the resistance drop in the armature winding, brushes 5 and 7, series winding 23 and the power and lighting circuit.

In order to compensate for the cross-magnetizing magnetomotive force in line with the set of poles 9—9' due to the current supplied to the power and lighting circuit flowing through the armature winding between the brushes 5 and 7, I connect the power and lighting circuit so that the current supplied thereto flows through the series field winding 18 on the set of poles 9—9'.

As the charge of the battery 15 increases, the current through the series winding 27 of the switch 24 decreases until a point is reached where the spring 29 overpowers the magnetic pull of the winding 27. Switch 24 thereupon opens and disconnects the positive brush 5 from the battery 15 and the power and lighting circuit 21. The switch 24 also opens the circuit of the ignition coil 28 to stop the engine 1 and connects the power and lighting circuit 21 directly across the battery 15, thereby restoring the apparatus to its idle condition.

The arrangement shown in Fig. 2 is the same as that shown in Fig. 1 except that the exciting winding 11 for the set of field poles 9—9' is connected across the battery circuit instead of across the power and lighting circuit 21. With the exciting winding connected in this manner the voltage impressed across the battery terminals increases at a faster rate than with the arrangement shown in Fig. 1 when the charging current decreases due to the battery becoming charged.

It is apparent that while I have shown and described two modifications of my invention, various other modifications and changes may be made without departing from the spirit of my invention, and therefore I desire to cover in the appended claims all such modifications and changes which fall within the spirit and scope of my invention.

What I claim as new and desire to secure by Letters Patent of the United States, is:—

1. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for the set of poles last mentioned and a plurality of translation circuits connected to said brushes, one of said translation circuits being connected across said 180 degree brushes, another of said translation circuits being connected to be supplied at the voltage induced by said one set of poles only, said exciting winding being connected across one of said translation circuits.

2. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for the set of poles last mentioned and a plurality of translation circuits connected to said brushes, one of said translation circuits being connected across said said 180 degree brushes, and another of said translation circuits being connected to be supplied at the voltage induced by said one set of poles only, said exciting winding being connected across said last mentioned translation circuit.

3. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a plurality of translation circuits connected to said brushes, one of said translation circuits being connected across said 180 degree brushes, another of said translation circuits being connected to be supplied at the voltage induced by one of said sets of poles only, a winding connected across one of said translation circuits and arranged to excite one of said sets of poles only, and another winding connected across one of said translation circuits and arranged to excite the other of said sets of poles only.

4. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a plurality of translation circuits connected to said brushes, one of said translation circuits being connected across said 180 degree brushes, another of said translation circuits being connected to be supplied at the voltage induced by one of said sets of poles only, and an exciting winding for each of said sets of poles connected across said last mentioned translation circuit.

5. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles the third brush being arranged with respect to said poles so that the voltage between said third brush and one of said 180 degree brushes is dependent on the flux in one only of said sets of poles, an exciting winding for each set of poles and arranged so that the direction of the flux in both sets of poles is such as to cause both sets of poles to induce electromotive forces in the same direction in the armature winding between said 180 degree brushes, a translation circuit connected to said third brush and one of said 180 degree brushes, a second translation circuit including a storage battery connected to said 180 degree brushes, and a winding on one of said sets of poles connected in series with said second translation circuit and arranged to produce a flux therein in opposition to the flux produced by the exciting winding for said set of poles.

6. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles and arranged so that the direction of the flux in both sets of poles is such as to cause both sets of poles to induce electromotive forces in the same direction in the armature winding, between said 180 degree brushes, a translation circuit connected across said third brush and one of said 180 degree brushes, a second translation circuit including a storage battery connected to said 180 degree brushes, the machine being constructed and arranged so that the magnetomotive force produced in one of said sets of poles by the cross-magnetizing magnetomotive force due to the load current in the armature winding is in the same direction as the magnetomotive force produced by the exciting winding therefor and so that the magnetomotive force produced in the other set of poles by the cross-magnetization due to the load current in the armature winding is in opposition to the magnetomotive force produced therein by the exciting winding therefor.

7. An electrical system comprising an inherently regulated self-excited dynamo electric machine having an n pole armature winding, and a field structure comprising 2n mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles and arranged so that the direction of the flux in both sets of poles is such as to cause both sets of poles to induce electromotive forces in the same direction in the armature winding between said 180 degree brushes, a translation circuit including a storage battery connected to said 180 degree brushes, a second translation circuit connected to be supplied at the voltage induced by one of said sets of poles only, the machine being constructed and arranged so that the cross-magnetizing magnetomotive force due to the load current in the armature winding produces in the set of poles inducing the voltage supplied to said second translation circuit a magnetomotive force in opposition to the flux produced therein by the exciting winding therefor, and produces in the other set of poles a magnetomotive force in the same direction as the magnetomotive force produced therein by the exciting winding therefor.

8. An electrical system comprising an inherently regulated self-excited dynamo electric machine having an n pole armature winding and a field structure comprising 2n mechanical field poles arranged in two sets with an equal number of poles in each set, adjacent poles of separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles connected to be supplied at the voltage induced by one of said sets of poles only, a translation circuit including translating devices requiring a substantially constant voltage to be impressed thereon connected to be supplied at the voltage induced by said last mentioned set of poles only, a second translation circuit including a storage battery connected to said 180 degree brushes, a winding connected in series with said first mentioned translation circuit and arranged to produce in the set of poles inducing the voltage supplied to said first mentioned translation circuit a magnetomotive force having the same direction as the magnetomotive force produced by the exciting winding therefor, and a winding connected in series with said second mentioned translation circuit and arranged to produce in the other set of poles a magnetomotive force in opposition to the magnetomotive force produced therein by the exciting winding therefor.

9. An electrical system comprising an inherently regulated self-excited dynamo electric machine having an n pole armature winding and a field structure comprising 2n mechanical field poles arranged in two sets with an equal number of poles in each set, adjacent poles of separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles connected to two of said brushes and arranged so that the direction of the flux in both sets of poles is such as to cause both sets of poles to induce electromotive forces in the same direction in the armature winding between said 180 degree brushes, a translation circuit including a storage battery connected to said 180 degree brushes, a second translation circuit connected between said third brush and one of said 180 degree brushes, the machine being constructed and arranged so that the magnetomotive force produced in one of said sets of poles by the cross magnetizing magnetomotive force due to the load current in the armature winding is in the same direction as the magnetomotive force produced by the exciting winding on said set of poles, and a winding on said last mentioned set of poles connected in series with said first mentioned translation circuit and arranged to produce a magnetomotive force therein in opposition to the magnetomotive force produced therein by the cross magnetization.

10. An electrical system comprising an inherently regulated self-excited dynamo electric machine having an $n$ pole armature winding, and a field structure comprising $2n$ mechanical field poles arranged in two sets with an equal number of poles in each act, adjacent poles of separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles and arranged so that the direction of the flux in both sets of poles is such as to cause both sets of poles to induce electromotive forces in the same direction in the armature winding between said 180 degree brushes, a translation circuit including a storage battery connected to said 180 degree brushes, a second translation circuit connected to be supplied at the voltage induced by one of said sets of poles only, the machine being constructed and arranged so that the cross-magnetizing magnetomotive force due to the load current in the armature winding produces in the set of poles inducing the voltage supplied to said second translation circuit a magnetomotive force in opposition to the magnetomotive force produced therein by the exciting winding therefor, and produces in the other set of poles a magnetomotive force in the same direction as the magnetomotive force produced therein by the exciting winding therefor, and a winding on said last mentioned set of poles connected in series with both of said translation circuits and arranged to produce in said set of poles a magnetomotive force in opposition to the magnetomotive force produced by the cross magnetization.

In witness whereof I have hereunto set my hand this 15th day of October, 1920.

SVEN R. BERGMAN.